BEST AVAILABLE COPY

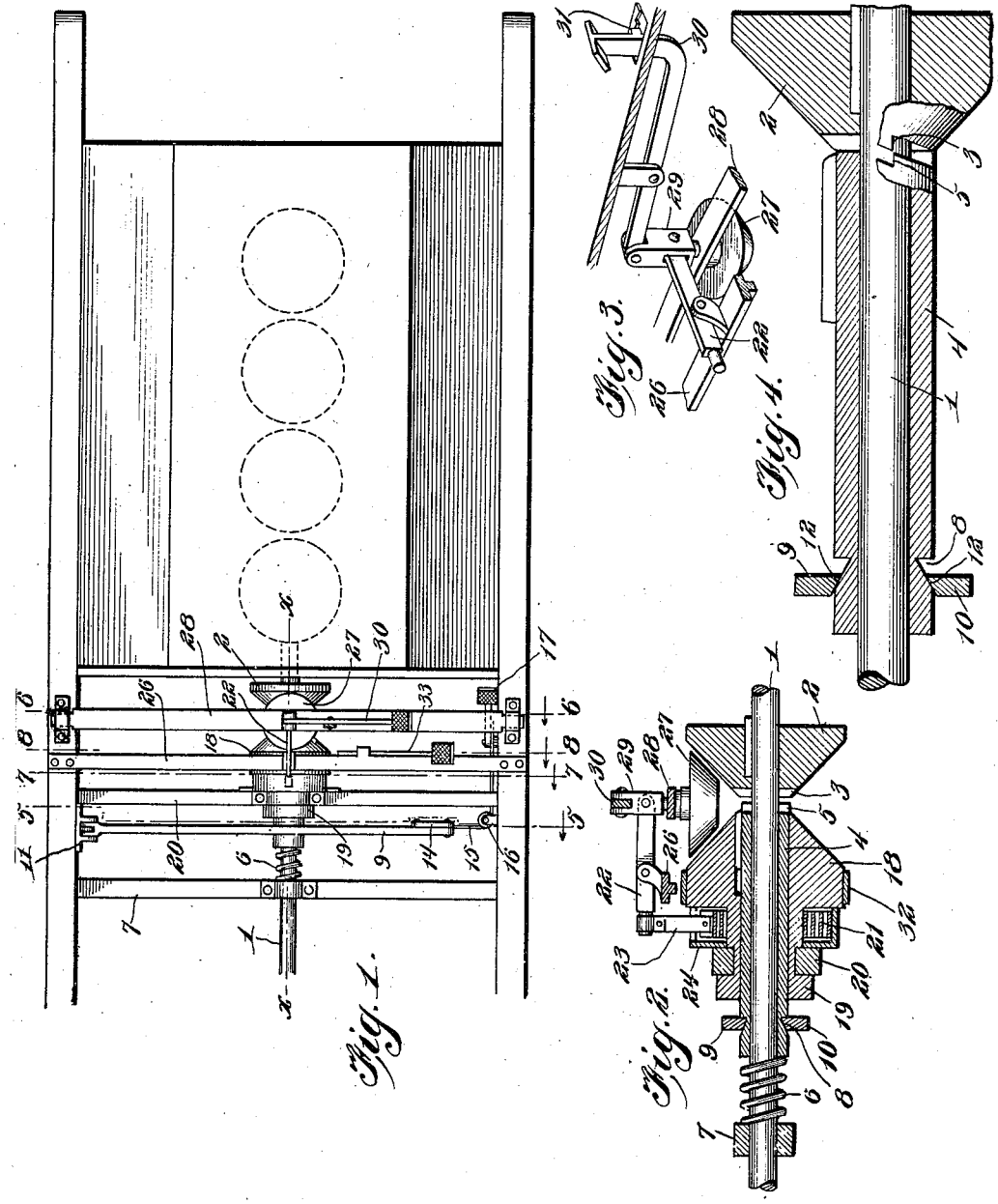

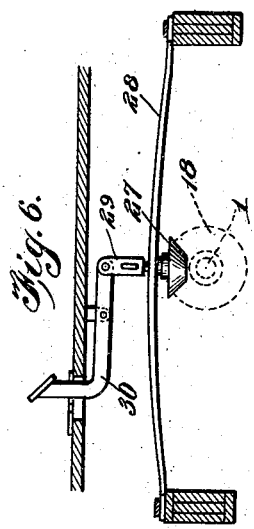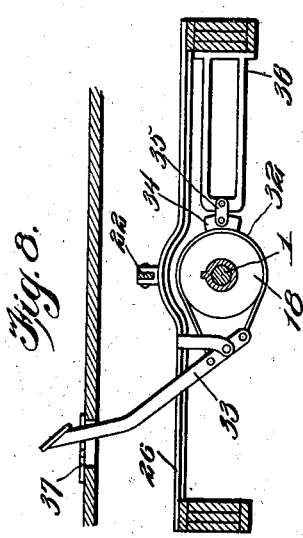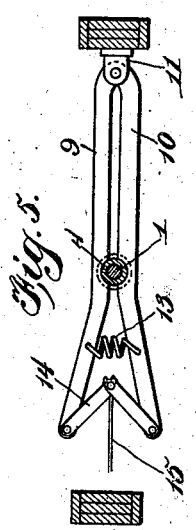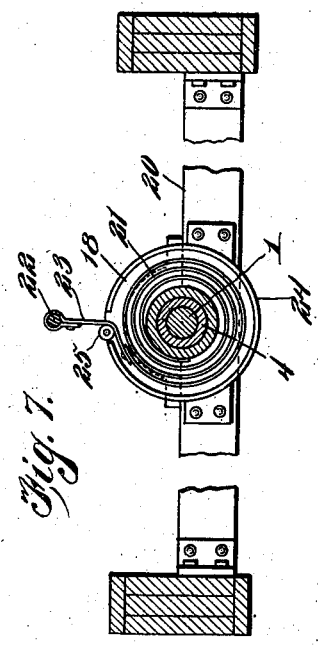

UNITED STATES PATENT OFFICE.

WILBERT B. SPEICE, OF PAYNE, OHIO.

AUTOMOBILE-STARTER.

1,028,624.　　　Specification of Letters Patent.　　Patented June 4, 1912.

Application filed September 13, 1911. Serial No. 649,040.

*To all whom it may concern:*

Be it known that I, WILBERT B. SPEICE, a citizen of the United States, residing at Payne, in the county of Paulding and State of Ohio, have invented new and useful Improvements in Automobile-Starters, of which the following is a specification.

The primary purpose of this invention is to devise novel means whereby the engine of an automobile or other vehicle may be started by the operator when seated, thereby avoiding the objections incident to starting an engine of the explosive type when used as the motive power for propelling the vehicle.

The present invention contemplates a spring which is wound by the engine when in motion, the spring winding mechanism being automatically thrown out of action when the spring has been wound to the predetermined degree, thereby preventing overwinding or the breaking or straining of parts.

The invention further contemplates the provision of means whereby the force stored in the spring may be utilized for starting the engine, clutch and brake devices of unique structure being employed in conjunction with the spring and spring winding mechanism to enable the desired result to be attained in an effective and efficient manner.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of part of the chassis of an automobile or like vehicle provided with starting mechanism embodying the invention. Fig. 2 is a sectional detail of the starting mechanism on the line *x*—*x* of Fig. 1. Fig. 3 is a perspective view of the friction wheel for transmitting power from the wheel secured to the engine shaft to the wheel for winding the power spring, showing the parts intimately associated therewith. Fig. 4 is a longitudinal section of the clutch sleeve and clutch wheel, together with a part of the engine shaft and the clamp, showing the parts on a larger scale. Fig. 5 is a cross section on the line 5—5 of Fig. 1. Fig. 6 is a cross section on the line 6—6 of Fig. 1. Fig. 7 is a cross section on the line 7—7 of Fig. 1. Fig. 8 is a cross section on the line 8—8 of Fig. 1.

Corresponding and like parts are referred to in the following description and indicated in all the views of the drawings, by the same reference characters.

The engine shaft is indicated at 1 and is provided with a wheel 2 which is secured thereto in any manner to rotate therewith. The wheel 2 has a bevel face and is provided upon one side with clutch teeth or jaws 3. A sleeve 4 is mounted loosely upon the engine shaft 1 to move longitudinally thereon and to admit of the shaft turning freely therein. The inner end of the sleeve is provided with clutch teeth or jaws 5 to engage with the clutch teeth or jaws 3, whereby when the clutch sleeve 4 is turned to start the engine the shaft 1 will have a corresponding movement imparted thereto. A helical spring 6 mounted upon the engine shaft 1 and confined between a cross bar 7 and the outer end of the sleeve 4 normally exerts a pressure to move the sleeve 4 inward and bring the clutch teeth 5 into engagement with the clutch teeth 3. An annular groove 8 is formed in the sleeve near its outer end, one wall of the groove being straight and the other wall inclined. When the engine is running the sleeve 4 is held outward with the clutch teeth or jaws 5 clear of the clutch teeth or jaws 3 by means of a clamp which fits in the annular groove 8. The clamp is shown most clearly in Fig. 5 and comprises an upper member 9 and a lower member 10, both members being of similar construction and pivotally connected at one of their ends to each other and to a bracket 11, which latter is secured to a side bar of the chassis. Each of the members 9 and 10 has a portion notched to fit about the sleeve 4, the notched portion being beveled, as indicated at 12, to ride upon the beveled or inclined wall of the groove 8, as shown most clearly in Fig. 4. The parts are so arranged that when the teeth of the clutch sleeve 4 are clear of the teeth 3 of the wheel 2 the members of the clamp snugly fit within the groove 8, as indicated most clearly in Fig. 2, thereby enabling the engine shaft and wheel 2 to rotate without producing any noise which would result if the clutch teeth 3 and 5 were permitted to engage. A spring 13 normally draws the members 9 and 10 together. Links 14 are pivotally connected at their outer ends to the extremities of the clamp members 9 and 10 and incline inwardly and are pivotally connected at their inner ends. A cord or flexible connection 15 is attached to the inner ends of the links 14 and after passing over one or more guide pulleys 16 is attached to a lever 17 within convenient reach of the operator, whereby force may be applied to separate the members 9 and 10 and thereby release the sleeve 4 which is pressed forward by the spring 6 to bring the clutch members or jaws 3 and 5 into engagement preliminary to starting the engine.

A wheel 18 is mounted upon the sleeve 4 and has a feather and spline connection therewith to admit of the sleeve moving longitudinally through the wheel into and out of clutched engagement with the wheel 2. A hub 19 extends outwardly from a side of wheel 18 and is formed with an annular groove near its outer end to receive a cross bar 20, whereby the wheel 18 is prevented from having any movement in the length of the shaft 1 or sleeve 4, but is free to rotate. A spiral spring 21 is mounted upon a part of the hub 19 and has one end secured thereto, the outer end of said spring being connected to one end of a lever 22 by means of a strap or like flexible connection 23. The spring 21 is of sufficient strength to start the engine after being wound. A barrel or housing 24 incloses the spring 21 and has an opening for the passage of the flexible connection 23, a roller 25 being located at one side of the opening to prevent contact of the connection 23 with the part of the barrel bordering upon the opening. The lever 22 is fulcrumed intermediate of its ends to a cross bar 26.

A bevel wheel 27 is mounted in a flat spring 28 and its stub shaft is connected with a block or like part 29, which is pivotally connected to one end of the lever 22, an operating lever 30 being connected to said block. The wheel 27 is of the bevel type and is adapted to engage the bevel faces of the wheels 2 and 18 so as to transmit motion from the wheel 2 to the wheel 18 for winding up the power spring 21. After the spring 21 has been wound to the predetermined point the outer end of the lever 22 is drawn upon to elevate the opposite end of said lever and lift the wheel 27 out of engagement with the wheels 2 and 18 against the tension of the spring 28. The operating lever 30 is provided with a tooth 31 to engage a ratchet tooth so as to hold the wheel 27 clear of the wheels 2 and 18.

It is necessary to hold the wheel 18 from turning backward when the spring 21 is wound and this is effected by means of a brake, which as shown consists of a band 32 arranged to engage a straight portion of the wheel 18, the ends of the brake band being attached to a lever 33, which extends within convenient reach of the operator. The brake band 32 is shown attached to a block 34, which in turn is connected by means of a link 35 to a bracket 36 projecting from a side bar of the machine frame. When the spring 21 is wound the lever 33 is moved to set the brake band to prevent unwinding of the spring, said lever engaging a toothed plate 37.

In the operation of the invention it is assumed that the parts are arranged substantially as herein disclosed and that the power spring 21 is wound, the brake being set and the sleeve 4 being held out of clutched engagement with the wheel 2 by means of the clamp. When it is required to start the engine the flexible connection 15 is drawn upon to separate the members 9 and 10 of the clamp, thereby releasing the sleeve 4 which is moved by the spring 6 to throw the clutch teeth or jaws 5 and 3 into engagement, after which the lever 33 is moved to release the brake, thereby permitting the spring 21 to unwind and to turn the wheel 18, sleeve 4 and the wheel 2, with the result that the engine is started. After the engine gets under headway the wheel 2 rotating faster than the sleeve 4 will cause the teeth 3 to ride upon the teeth 5 of the sleeve 4 and move the latter outward to a position to cause the beveled portions of the clamp members 9 and 10 to engage the beveled or inclined wall of the groove 8, as indicated in Fig. 4, when the tension of the spring 13 will draw the clamp members together and cause a further outward movement of the sleeve 4 by reason of the beveled portions 12 of the clamp members riding on the beveled or inclined wall of the groove 8, thereby causing the clutch teeth or jaws 5 to completely clear the teeth 3 of the wheel 2, as indicated in Fig. 2. The lever 30 is now operated to admit of the spring 28 pressing the wheel 27 into engagement with the bevel faces of the wheels 2 and 18, with the result that the wheel 18 is rotated to wind up the spring 21 and when said spring reaches the predetermined tension the outer end of the lever 22 is drawn upon, thereby lifting the wheel 27 from engagement with the wheels 2 and 18, at which time the brake is applied to prevent backward rotation of the wheel 18 and an unwinding of the spring 21, thereby setting the starting mechanism for the next operation.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In engine starting mechanism, the combination of the engine shaft, a starting member adapted to make clutched engagement with the engine shaft, a power spring, two wheels the one fast to the engine shaft and the other having connection with the starting member and adapted to wind the power spring, a third wheel adapted to transmit motion from one of the two wheels to the other for winding the power spring, and means connecting the third wheel with the power spring to throw said third wheel out of engagement with the two wheels when the power spring has been wound to the predetermined point.

2. In engine starting mechanism of the character described, the combination of the engine shaft, a starting member adapted to make clutched engagement with the engine shaft, wheels, the one secured to the engine shaft and the other splined to the starting member, a power spring having connection with the last mentioned wheel, a third wheel for transmitting motion from one wheel to the other, and connecting means between said third wheel and power spring for automatically throwing the wheels out of engagement when the power spring has been wound to the predetermined point.

3. In engine starting mechanism of the character described, the combination of the engine shaft, a starting member adapted to make clutched engagement therewith, a wheel fastened to the engine shaft, a second wheel splined to the starting member, a third wheel adapted to transmit motion from one to the other of the before mentioned wheels, a spring supporting said third wheel, a power spring having one end connected with the wheel mounted upon the starting member, and a lever having one end connected with the power spring and the other end connected with the said third wheel to throw the latter out of engagement with the first mentioned wheels after the power spring has been wound to the predetermined point.

4. In starting mechanism for explosive engines, the combination of the engine shaft, a starting member loose upon the engine shaft and adapted to make clutched engagement therewith, a wheel fastened to the engine shaft, a second wheel splined to the starting member, a third wheel for connecting the two wheels to transmit movement from one to the other, a power spring having one end connected with the wheel loose upon the starting member, connecting means between the opposite end of the power spring and said third wheel for automatically throwing the latter out of engagement with the first mentioned wheels after the power spring has been wound to the predetermined point, and a brake adapted to hold the wheel mounted upon the starting member to prevent unwinding of the power spring substantially as and for the purpose specified.

In testimony whereof I affix my signature in presence of two witnesses.

WILBERT B. SPEICE.

Witnesses:
J. D. SPEICE,
B. C. BEDINGER.

---

Copies of this patent may be obtained for five cents each, by addressing the "Commissioner of Patents, Washington, D. C."